United States Patent [19]

Brothers et al.

[11] 3,822,598
[45] July 9, 1974

[54] PORTABLE ELECTRONIC THERMOMETER AND METHOD OF TEMPERATURE MEASUREMENT

[75] Inventors: Benton H. Brothers; William O. Christianson; Larry L. Hunter; Max R. Hunter; Bob E. Stauder; Donald D. Sitler, all of Tulsa, Okla.

[73] Assignee: LaBarge, Inc., St. Louis, Mo.

[22] Filed: Mar. 23, 1971

[21] Appl. No.: 127,243

[52] U.S. Cl. .......................................... 73/362 AR
[51] Int. Cl. ............................................. G01k 7/24
[58] Field of Search ............................... 73/362 AR

[56] References Cited
UNITED STATES PATENTS

| | | | |
|---|---|---|---|
| 3,111,032 | 11/1963 | Wormser et al. | 73/359 |
| 3,296,866 | 1/1967 | Zenmon Abe et al. | 73/362 AR |
| 3,435,400 | 3/1969 | Beckman | 73/362 AR X |
| 3,548,661 | 12/1970 | Lilly et al. | 73/362 AR |
| 3,550,448 | 12/1970 | Ensign | 73/362 AR X |
| 3,604,266 | 9/1971 | Chilton | 73/362 R |
| 3,702,076 | 11/1972 | Georgi | 73/362 AR |

Primary Examiner—Richard C. Queisser
Assistant Examiner—Frederick Shoon
Attorney, Agent, or Firm—Koenig, Senniger, Powers and Leavitt

[57] ABSTRACT

An electronic thermometer having a probe for introduction into a region having a temperature to be measured. The probe includes a temperature sensitive impedance element having a heat sensing relationship with the region when the probe is introduced thereinto. Timing means is provided for initiating a predetermined timing interval upon the temperature of the element exceeding a preselected level following introduction of the probe into the region. Circuitry measures the temperature of the element at the completion of the timing interval. A meter provides means for indicating a temperature which is a function of the measured temperature of the element at the completion of the timing interval, the indicated temperature being a substantially accurately extrapolated representation of the actual temperature in the region.

As a method of temperature measurement, the invention involves measurement of the impedance of the element at the end of the timing interval and before the temperature of the element reaches the actual temperature in the region. The time required for indicating the actual temperature is thus significantly reduced.

34 Claims, 12 Drawing Figures

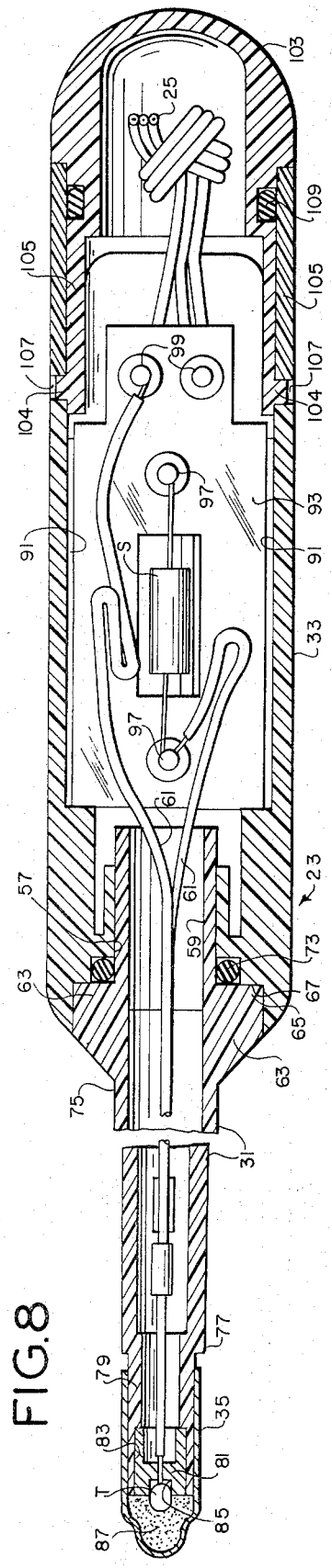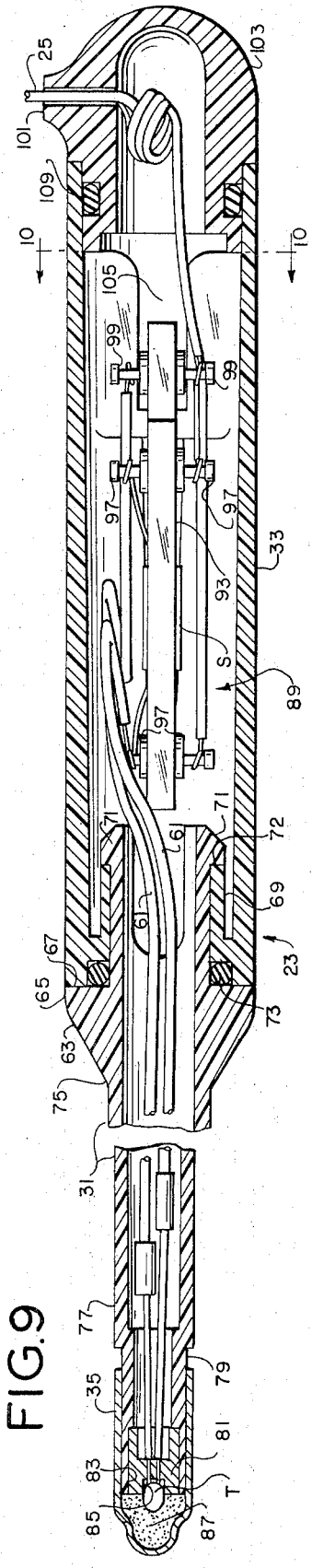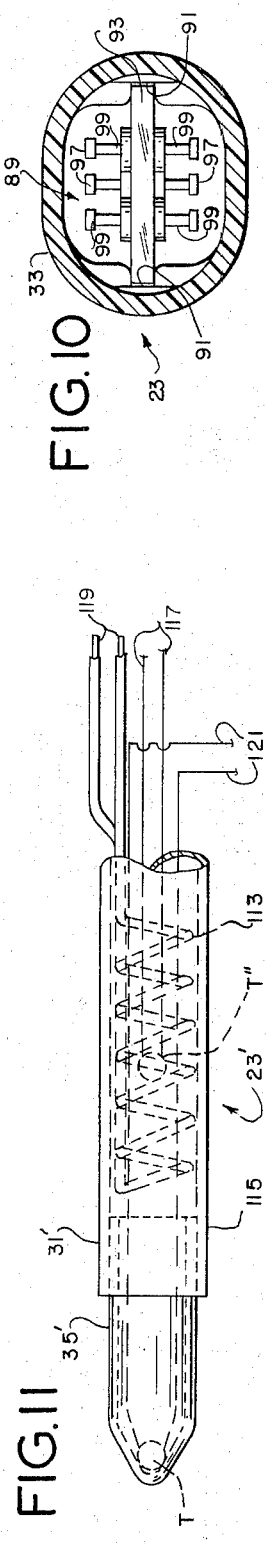

PORTABLE ELECTRONIC THERMOMETER AND METHOD OF TEMPERATURE MEASUREMENT

BACKGROUND OF THE INVENTION

This invention relates to electronic thermometers and more particularly to portable, probe-type electronic thermometers for clinical measurement of human body temperature.

In recent years there has been considerable interest in the development of electronic thermometers for clinical use as a means of overcoming numerous disadvantages of conventional glass mercury-bulb thermometers. Such disadvantages include difficulty in effectively sterilizing them to prevent cross-contamination; high cost resulting from frequent breakage and the large number required; inaccurate temperature measurement characterized by errors both as to reproducibility of measurement and as between measurements of different thermometers; and slow response time requiring a relatively long time for temperature measurement. Much of the art in this field is disclosed by the following representative U.S. Pat. Nos.: 2,919,580; 3,139,753; 3,187,576; 3,254,533; 3,348,415; 3,367,186; 3,377,862; 3,379,063; 3,402,378; 3,431,781; 3,530,718.

Despite many interesting approaches, prior art efforts in the growing electronic thermometer art have typically enjoyed only limited success, and have themselves been plagued with the above-described problems of difficulty in sterilization, inaccuracy, and slow response. To overcome the sterilization problem, it has been proposed to utilize disposable probe covers or sheaths as disclosed in U.S. Pat. Nos. 3,372,862; 3,367,186; 3,254,533; and others. However, some covers tend to slow temperature response and thus if there is already slow response, this problem may be worsened.

Other electronic thermometer approaches have sought to overcome the accuracy problem through use of conventional impedance bridge circuitry which is supplied by a regulated voltage, as through use of a zener diode or the like. The disclosures of U.S. Pat. Nos. 3,217,544 and 3,413,853 are exemplary. However, even this has not guaranteed accuracy, since in a portable battery-powered circuit, the battery voltage may fall after a time to a level below which the supply voltage can no longer be regulated. Inaccurate temperature measurement may, therefore, still occur.

To overcome the problem of slow response, it has been proposed to utilize a field-effect transistor (FET) as a probe sensing element, together with means for heating the FET to a temperature from which it can more quickly rise to body temperature. Such an arrangement is disclosed in U.S. Pat. Nos. 3,491,596 and 3,540,283. However, the clinical utility of this approach may be limited by its peculiar nature to measurement of temperature by insertion of the probe in the ear or by placement of the probe at the axilla. Such an FET probe is not readily adapted to measurement by oral or rectal insertion or to the use of disposable probe covers.

Regardless of these several important advances in the art, there continues to remain a problem in the art of inaccurate temperature measurement resulting from various error-producing thermal factors occurring during use of the temperature probe. As a practical matter, the sensing element cannot be completely thermally isolated from the remaining portions of the probe assembly. Hence, the element's temperature is affected by factors thermally influencing the probe. For example, the probe is influenced not only by variations in ambient temperature but also by such factors as heating by the hand of the user, e.g., a nurse who is holding the probe, as well as the frequency of use, et cetera.

SUMMARY OF THE INVENTION

Among the several objects of the invention may be noted the provision of an electronic thermometer which is adapted for clinical measurement of body temperature; the provision of such an electronic thermometer and methods of temperature measurement permitting rapid i.e., accelerated determination of body temperature, requiring only a fraction of the time required for a mercury thermometer; the provision of such an electronic thermometer which is portable and is battery powered; the provision of such a thermometer which is accurate and dependable and automatically prevents inaccurate temperature indications due to insufficient battery voltage; the provision of such a thermometer which is conveniently carried and used, having small size and light weight; the provision of such a thermometer which provides a sustained indication of the measured temperature after initial indication thereof; the provision of such a thermometer which provides both an initial measured temperature indication and also a verified temperature indication; the provision of a thermometer which does not require manual off-on actuation in use; the provision of such a thermometer which can be used for oral, rectal and axillary temperature measurements; the provision of such a thermometer which includes a temperature probe permitting the use of low-cost and disposable probe covers which prevent cross-infection or re-infection of patients; the provision of such a thermometer having a probe and which provides accurate temperature measurement in having relative immunity to error-producing thermal factors influencing the probe; the provision of such a thermometer which is rugged and reliable, utilizing solid-state integrated circuit components, and which is economically manufactured. Other objects and features will be in part apparent and in part pointed out hereinafter.

Briefly, an electronic, battery-powered, probe-type thermometer of the invention for accelerated indication of temperatures includes a probe for introduction into a region having a temperature which is to be measured. The probe has a temperature sensitive element having a heat sensing relationship with the region when the probe is so introduced. Timing means initiates a predetermined timing interval in response to the temperature of the element exceeding a preselected level following said introduction of the probe. Means is provided for measuring the temperature of the element at the completion of the timing interval and before the element reaches the actual region temperature. A meter or other means indicates a temperature which is a function of the measured temperature of the element at the completion of the timing interval, the indicated temperature being a substantially accurate extrapolation of the temperature in the region. The temperature indication is thereby provided in substantially less time than would be required for the temperature of the element to reach the actual region temperature.

In a commercially preferred embodiment, the probe includes an elongate quill, a portion of which is adapted to be introduced into the region, the quill portion having a first temperature sensitive element adapted to have a relatively good heat exchange relationship with the region when the quill is introduced thereinto. The quill has a second temperature sensitive element spaced from the first element and responsive to the temperature of the quill but has a relatively poor heat exchange relationship with the region when the quill portion is introduced thereinto. Temperature measuring means is interconnected with the two elements and is responsive jointly thereto for providing a temperature measurement which is a function of the temperatures thereof when the probe is introduced into the region. A meter or other means is responsive to operation of the measuring means for indicating the measured temperature in the region. As a result of this arrangement, accuracy of the indicated temperature is substantially unaffected by variations of the quill temperature.

In another embodiment, the quill includes a heater. The second temperature sensitive element is interconnected with a control circuit for energizing the heater as a function of the quill temperature thereby to maintain the quill substantially at a predetermined temperature regardless of variations in ambient temperature. Accordingly, the accuracy of the indicated temperature is substantially unaffected by factors tending to cause variation of the quill temperature.

A further feature of the invention involves the provision of means for deactuating the temperature measuring means upon the battery potential falling below a preselected level below which erroneous temperature indications would be provided. Thus, display of an indicated temperature is prevented upon the battery potential falling sufficiently to cause a significant error in the indicated temperature.

BRIEF DESCRIPTION OF THE DRAWINGS

FIGS. 8 and 9 are top and side cross sectional views, respectively, of the probe shown in FIG. 1;

FIG. 10 is a view in cross section taken along line 10—10 of FIG. 9;

FIG. 11 is a view in elevation of portions of another probe assembly adapted for use in conjunction with the circuitry of FIG. 7.

Corresponding reference characters indicate corresponding parts throughout the several views of the drawings.

DESCRIPTION OF THE PREFERRED EMBODIMENTS

Figure 1:
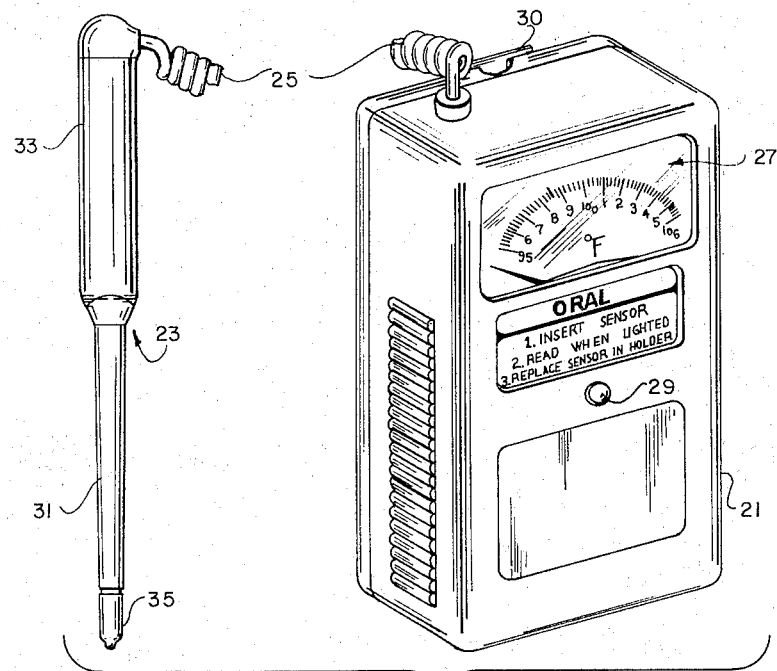
FIG. 1 is a view showing, in perspective, a portable electronic thermometer unit of the invention and, in elevation, a probe assembly which is a part of the thermometer.

Referring now to the drawings, and more particularly to FIG. 1, an electronic thermometer of the present invention includes a small, portable enclosure unit 21. A probe designated generally 23 is connected to unit 21 by a coiled cable 25. Unit 21 includes a meter 27 for indicating body temperature measured by probe 23. A signal light 29 serves as means for indicating or signalling when meter 27 accurately indicates the measured body temperature. The thermometer may be used for oral, rectal or axillary measurement of body temperature and may be specially calibrated for each such application and labeled accordingly, e.g., for oral use only, as unit 21 is so labeled.

Unit 21 encloses circuitry of the thermometer and includes batteries which power the instrument. Unit 21 is approximately the size of a king-size cigarette package and may be molded of a suitable synthetic resin material. The unit preferably includes a suitable retainer clip on the rear thereof, serving as means for holding or storing probe 23 by retaining it in a receptacle or channel 30 when it is not in use. A switch is preferably provided in conjunction with the clip so that when probe 23 is removed from its stored position the switch is actuated to energize the thermometer circuitry for operation, but deactuated when the probe is secured in channel 30. This "hands off" feature is advantageous since the unit is immediately readied for temperature measurement operation upon removal of the probe from its stored position without requiring additional manual actuation of switches or the like.

Probe 23 includes an elongate quill 31 including at one end a handle 33. Extending from quill 31 is a tip portion 35 adapted to be introduced into a region and having a temperature sensitive impedance element located therein for measuring or sensing the temperature in the region into which the tip is introduced. Quill 31 is tapered slightly from its diameter at handle 33 to a slightly smaller diameter at tip 35, permitting a flexible sheath or sleeve of the disposable variety noted previously to be placed on quill 31 when a temperature measurement is to be made.

Figure 3:
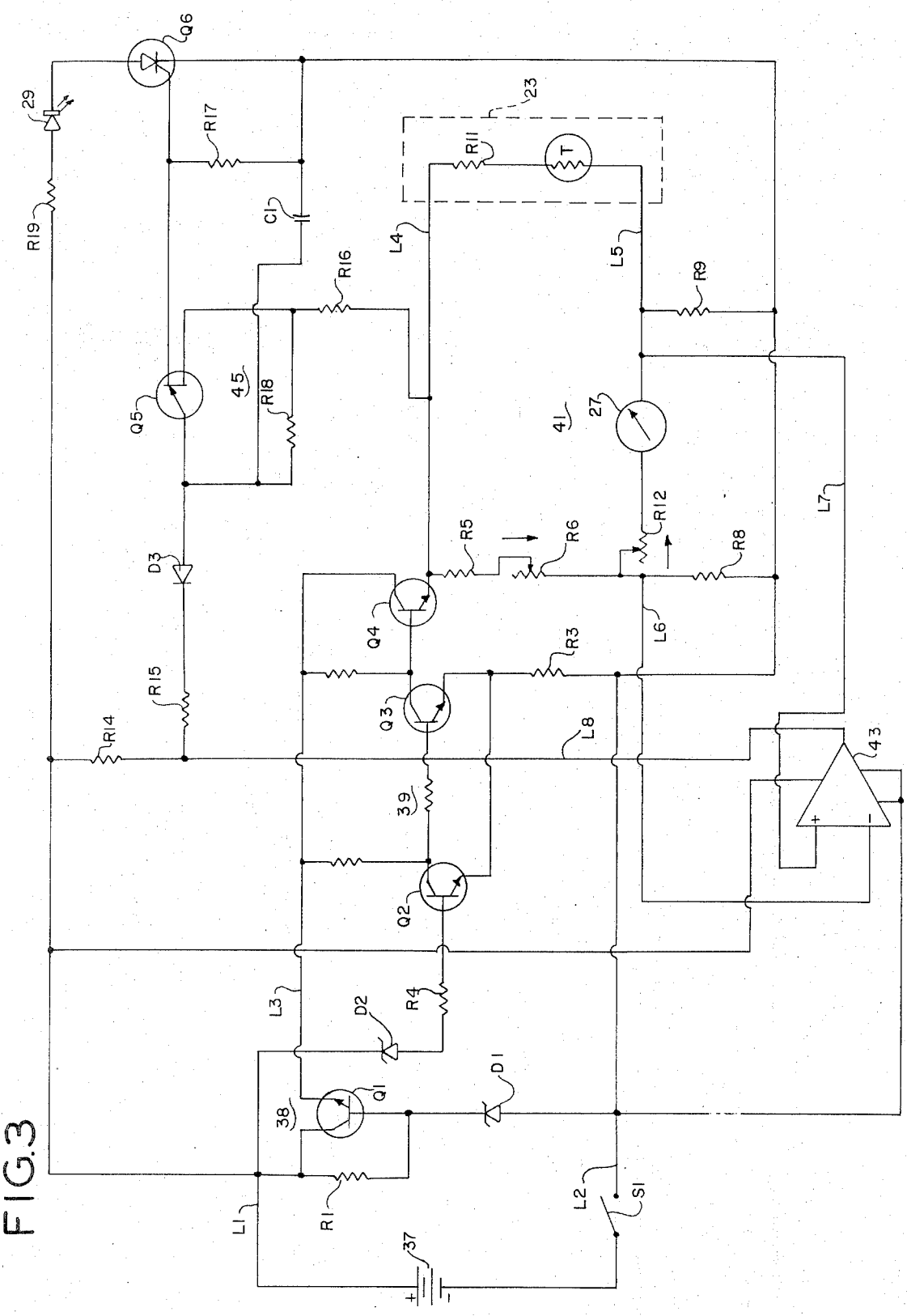
FIG. 3 is a schematic circuit diagram of circuitry of another embodiment of the invention.

Referring now to FIG. 3, a first embodiment of the invention is shown including circuitry powered by a battery 37 whose positive and negative terminals are connected thereto by a pair of leads L1 and L2, respectively. Lead L2 includes a switch S1 which may be actuated, as noted above, when probe 23 is removed from its stored position in receptacle 30. Switch S1 may instead be a pushbutton as noted. The battery voltage is delivered to a regulating circuit 38 including an NPN transistor Q1 having a resistor R1 connected between its collector and base. The regulating circuit includes a Zener diode D1 connected between the base Q1 and lead L2 so that R1 controls the conduction of Q1 to supply a regulated positive potential via a lead L3 with respect to lead L2.

A Schmitt trigger switching circuit 39 includes a pair of NPN transistors Q2 and Q3 whose emitters are connected together through a common resistor R3 to lead L2. Circuit 39 is supplied by the regulated supply lead L3 while the base of transistor Q2 is connected to the unregulated supply lead L1 through a resistor R4 and diode D2. Circuit 39 controls the conduction of a further NPN transistor Q4 whose collector-emitter terminals are connected in a circuit with lead L3. Transistor Q4 controls the application of the regulated potential across leads L3 and L2 to an impedance bridge 41 across which is connected meter 27.

Bridge 41 includes four arms, one of which comprises a resistor R5 in series with a calibration potentiometer R6. Two other arms of the bridge comprise respective resistors R8 and R9. The fourth arm of the bridge includes thermistor T connected in series with a trimmer resistor R11, both of which are part of probe 23 which is represented in FIG. 3 by a dashed line. A pair of leads L4 and L5 of cable 25 connect thermistor T and resistor R11 as a part of the bridge 41. Bridge 41 includes also a potentiometer R12 for calibration of meter 27. Thermistor T constitutes the temperature sensitive impedance element of probe 23, and is adapted to have a thermally conductive relationship with the region into which the tip of quill 31 is introduced. Bridge 41 constitutes means for measuring the temperature of thermistor T and meter 27 is responsive to operation thereof for indicating the temperature in the region, into which the tip of quill 31 is extended, as a function of the measured temperature of thermistor T.

A differential amplifier 43, preferably of the monolithic integrated circuit variety (such as commercially available type LM311), has its inverting and noninverting input terminals connected across bridge 41 by a respective pair of leads L6 and L7. Differential amplifier 43 constitutes means for detecting balancing of bridge 41, which occurs in response to the impedance of thermistor T having a preselected level following introduction of the probe into the region whose temperature is to be measured. The output of differential amplifier 43 is connected by a lead L8 to the junction of a pair of resistors R14 and R15 for controlling the biasing of a diode D3 which is connected in a timer circuit 45. Timer circuit 45, together with differential amplifier 43, constitutes means for initiating a predetermined timing interval upon the temperature of the element exceeding this preselected level.

Circuit 45 includes a unijunction transistor (UJT) Q5 whose emitter is connected in a circuit with a timing capacitor C1 which is adapted to charge through a pair of resistors R16 and R18 when the output of differential amplifier 43 becomes positive, reverse biasing diode D3. Depending upon its intrinsic standoff ratio, transistor Q5 is triggered when the voltage on capacitor C1 attains a predetermined level, causing a pulse to be developed across a load resistor R17. This pulse causes triggering of a silicon controlled rectifier (SCR) Q6 whose gate or triggering terminal is connected to one side of resistor R17. The cathode-anode terminals of this SCR are connected in a series circuit with a light-emitting diode (LED) and a current limiting resistor R19 between leads L1 and L2, so that, when triggered, the SCR energizes the LED. This LED constitutes signal light 29 of FIG. 1. Thus light 29 signals or indicates completion of the timing interval determined by timer circuit 45. Preferably, the values of capacitor C1 and resistors R16 and R18 are chosen to provide a timing interval of approximately 10 seconds.

In operation, the circuitry of FIG. 3 permits rapid or short-term measurement of temperature through the method of temperature measurement which involves introducing quill 31, which includes thermistor T, into the region (e.g., the mouth, the rectum, or the axilla) whose temperature is to be measured, and then initiating a predetermined timing interval when the temperature of thermistor T exceeds a preselected level, such as about 93°F., following such introduction of the quill 31. The impedance of thermistor T is then measured at the end of the 10-second timing interval, at which time the temperature of thermistor T has not yet reached the actual temperature in the region. The end of the timing interval is signalled by energization of LED signal light 29. Upon this signal, meter 27 is read or observed as indicating a temperature which is a function of the measured temperature of thermistor T at the end of the timing interval. Meter 27 is calibrated so that the indicated temperature is an extrapolation of the measured temperature of thermistor T at the end of the timing interval and accurately represents the actual temperature in the region.

In certain embodiments of a thermometer constructed according to the invention, the values of thermistor T and components of bridge 41 have been chosen to provide balancing of the bridge when the temperature of thermistor T is 92.7°F. The timing interval is chosen as of approximately 10 seconds duration. Meter 27 is calibrated to provide indication of the normal body temperature, i.e., 98.6°F., when the temperature of the thermistor element is actually 2° to 2½°F. less than such normal body temperature. Beginning with introduction of the probe into the mouth of the individual whose temperature is to be taken, a period of about 10 to 15 seconds is typically required to reach balancing of the bridge. Such balancing initiates the 10-second timing interval, and at the end of the 10-second interval the meter 27 is read. The required total interval from insertion of the probe to indication of the temperature of the patient typically is about 10 to 25 seconds.

Since the temperature of the thermistor element, when placed in the mouth, increases as an exponential function of time, a considerably longer interval than this total of 25 seconds would be required for the temperature of the element to reach the actual temperature in the mouth. In fact, it is found that as much as 2 minutes thus may be required to heat the thermistor element from room temperature to the actual mouth temperature, for example. Thus, measurement of the temperature of the element at the end of the timing interval and before its temperature reaches the actual temperature in the region saves a great deal of time in providing a rapid temperature indication, particularly as compared with temperature measurement with a conventional mercury glass thermometer requiring three to five minutes. Yet each short-term indication is consistently accurate in measurement.

A significant further aspect in the operation of this circuit of FIG. 3 involves trigger or switching circuit 39 which normally causes transistor Q4 to be conductive, thereby to supply the regulated voltage between leads L3 and L2 to bridge 41. Because of its characteristics, this Schmitt trigger switching circuit 39 is adapted to switch rapidly at a preselected input voltage level from a condition in which transistor Q4 is conductive and Q3 is nonconductive to one in which the reverse is true. This switching level is selected to be slightly higher than a predetermined battery voltage below which regulating circuit 38 would fail to supply adequately regulated voltage to bridge 41 for accurate temperature measurement. Thus, if through use of the battery or normal aging thereof, etc., the battery potential drops to the preselected switching threshold, transistor Q2 switches to a nonconductive state and transistor Q3 switches to a conductive state, thereby rendering transistor Q4 nonconductive and interrupting the supply of regulated battery potential to bridge 41, thereby to prevent the instrument from indicating the erroneous temperature.

Figure 4:
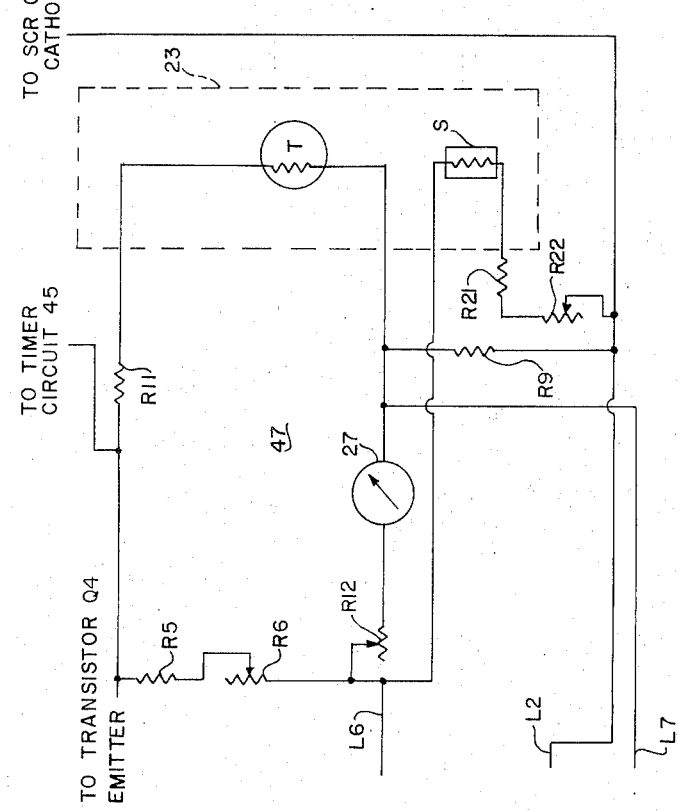
FIG. 4 is a schematic circuit diagram of portions of the circuitry of a further embodiment similar to that shown in FIG. 3.

Referring now to FIG. 4, a modification of the bridge circuitry of FIG. 3 is illustrated which provides an improved bridge circuit 47 and which is connected in the same way as bridge 41 of FIG. 3. Probe 23 is modified to include a second temperature sensitive impedance element S constituting a temperature compensation impedance element. Preferably, this second element S is a silicon resistor sold under the trademark Sensistor with a positive temperature coefficient (PTC) of resistivity, while thermistor T has a negative temperature coefficient (NTC) of resistivity. Sensistor S is preferably located in a chamber of handle 33 of probe 23, so that it is spaced from thermistor T to provide a relatively poor heat-exchange relationship with the region into which the quill tip is introduced, while providing a relatively good heat-exchange relationship with quill 31 and handle 33. Sensistor S is thus responsive to the temperature of probe 23 itself but not to the temperature in the region into which the tip, with its thermistor T, is introduced.

Since Sensistor S is a PTC element, its impedance varies as a function of its temperature in an opposite algebraic sense from the impedance of thermistor T, an NTC element. In a probe constructed according to the invention, as later described specifically, sensor S had a resistance of 3,300 ohms and a temperature coefficient of 7,000 ppm, while thermistor T had an essentially linear resistance-temperature characteristic shown by the following tabular values:

| Temperature (°C.) | Resistance (ohms) |
|---|---|
| 34 | 7014 |
| 38 | 5931 |
| 42 | 5054 |

Still referring to FIG. 4, Sensistor S is shown connected in one arm of bridge 47 in series with a resistor R21 and a calibration potentiometer R22. Thus, both the Sensistor S and thermistor T are interconnected in arms of bridge 47 and the bridge is thus responsive jointly thereto for providing a temperature measurement which is a function of the temperatures of both elements when the quill 31 of probe 23 is introduced into a region whose temperature is to be measured. As in FIG. 3, meter 27 is responsive to operation of bridge 47 to indicate the measured temperature in the region.

Because Sensistor S is responsive to the temperature of probe 23, it compensates for thermal factors which, in influencing the probe, might otherwise tend to produce error in temperature measurement. Such error-producing thermal factors could cause inaccurate temperature measurement, since thermistor T cannot be completely thermally isolated from quill 31 and other portions of probe 21. During frequent handling of the probe 23, its temperature will tend to be increased by the hand of the user, thereby tending to increase the thermistor's temperature. More importantly, the ambient temperatures to which the probe is exposed tend to cause variation in the thermistor temperature. For example, if the ambient temperature is relatively cool, so also will be the temperature of probe 23, tending to reduce the temperature of thermistor T during a temperature measurement, and thereby possibly producing an erroneous temperature measurement. However, Sensistor S compensates for such changes in temperature and tends to reduce or eliminate the effects of such thermal factors on the probe. As a result, the accuracy of the indicated temperature in an embodiment utilizing this compensating element S is substantially unaffected by variations in the quill temperature. By thus associating Sensistor S with quill 31 and effectively measuring the temperature of probe 23 through, in effect, measurement of the impedance of Sensistor S, and then causing the temperature indicated by meter 27 to be not only a function of the measured temperature of thermistor T but also of Sensistor S, the indicated temperature is a highly accurate representation of the actual temperature in the region in question.

Figure 5:
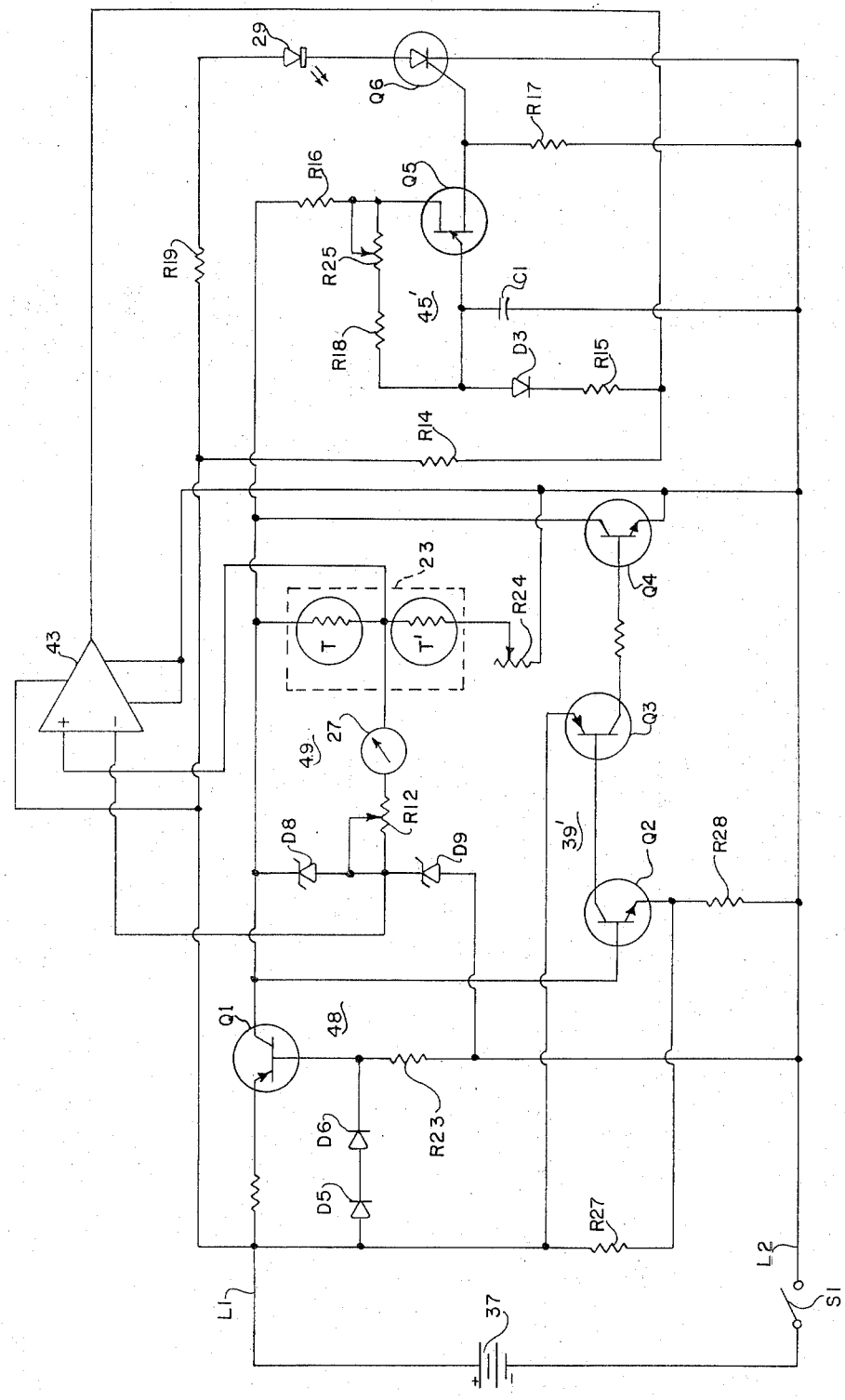
FIG. 5 is a schematic circuit diagram of yet another embodiment of the invention.

Referring to FIG. 5, a much simplified embodiment of the invention is illustrated which utilizes principles and features of the embodiments of FIGS. 3 and 4. This embodiment includes a current regulating circuit 48 including transistor Q1 having its base interconnected with a pair of diodes D6 and D7 which are biased to the negative lead L2 through a resistor R23, so as to provide a regulated current to a bridge 49. Bridge 49 includes a pair of Zener diodes D8 and D9 connected in two respective arms thereof. Probe 23 includes thermistor T and also a further thermistor T' providing a temperature compensation impedance element. Both of these thermistors may be of the NTC type and are respectively connected in the two remaining arms of the bridge. A calibration potentiometer R24 is connected in series with thermistor T'. Preferably, thermistor T' is positioned in the handle portion 33 of probe 23, as is the Sensistor S of FIG. 4.

Meter 27 is connected across bridge 49 in series with calibration potentiometer R12 for providing temperature indication as explained previously. Differential amplifier 43 has its inverting and noninverting input terminals connected across bridge 49 for the same purpose as in FIG. 3 to cause initiation of a predetermined timing interval upon balancing of the bridge. For this purpose, amplifier 43 is connected with a timer circuit 45' like timer circuit 45 of FIG. 3 but including a calibration potentiometer R25. A trigger circuit 39' is a modification of circuit 39 of FIG. 3 providing greater simplification, e.g., in having the base of transistor Q2 connected directly to the collector of transistor Q1 of the regulating stage. The emitter of transistor Q3 is connected to the battery positive lead L1 and through a resistor R27 to the emitter of transistor Q2, which is biased to lead L2 through a resistor R28. In operation, the embodiment of FIG. 5 operates in the same way as that of FIG. 3.

Figure 6:
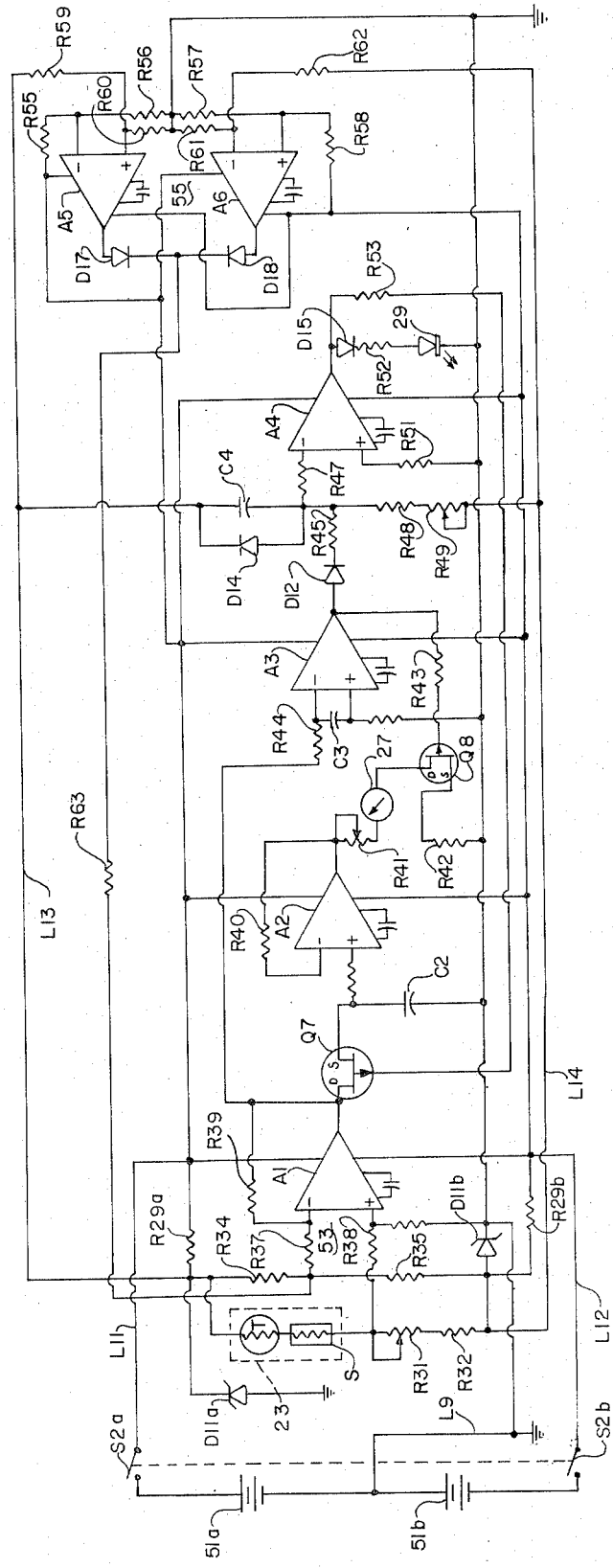
FIG. 6 is a schematic circuit diagram of the embodiment of the invention of FIG. 2.

Referring now to FIG. 6, there is illustrated an improved embodiment of the invention which can be readily contained in unit 21 of FIG. 1. Two batteries 51a and 51b are connected in series with their junction grounded via a lead L9. The positive side of battery 51a is connected through a first switch section S2a to a lead L11 when switch S2a is closed. Similarly, the negative side of battery 51b is connected to a lead L12 upon closure of a switch section S2b ganged for operation with switch section S2a. Switch Sections S2a and S2b are preferably adapted for being closed when probe 23 is removed from its storage position in receptacle 30 on the rear of unit 21, causing the unregulated positive and negative battery potentials to be supplied via leads L11 and L12, respectively, with respect to the circuit ground to certain portions of the circuitry. A Zener diode D11a is connected from the circuit ground through a resistor R29a to lead L11 to provide a regulated positive potential on a circuit lead L13 with respect to the circuit ground, while a corresponding Zener diode D11b and resistor R29b provide a regulated negative potential on a lead L14 with respect to the circuit ground. The regulated potentials supply certain other portions of the circuitry.

A bridge circuit 53 includes a first arm including thermistor T connected in series with Sensistor S. A corresponding lower arm includes a calibration potentiometer R31 in series with a resistor R32, while two other arms of bridge 53 are constituted by respective resistors R34 and R35. A differential operational amplifier A1 of the monolithic integrated circuit variety has its inverting and noninverting inputs connected through respective resistors R37 and R38 across bridge 53. Differential amplifier A1 and five other differential operational amplifiers A2–A6 each may be of the commercially available type μA741C. Alternatively, each may be one of a pair of such amplifiers of a dual unit operational amplifier circuit such as commercially available type LM1458 for saving of space.

When the temperature of thermistor T reaches a preselected level, bridge 53 becomes balanced and the output of amplifier A1 is then at zero potential. As the temperature of thermistor T increases from this level, the output of amplifier A1 increases positively in direct proportion to the impedance of thermistor T. A resistor R39 with R37 preferably sets the voltage gain of amplifier A1 at a factor of five. Interconnected with the output of amplifier A1 for controlling the charging of a capacitor C2 are the drain-source electrodes of a field-effect transistor (FET) Q7. The noninverting input terminal of operational amplifier A2 is interconnected with capacitor C2 while its output is connected through a feedback resistor R40 to the inverting input thereof to provide unit voltage gain with high input impedance. Connected from the output of amplifier A2 to the circuit ground is a series circuit including a calibration potentiometer R41, meter 27, the drain-source electrodes of a further FET Q8, and a resistor R42.

The gate of FET Q8 is interconnected through a resistor R43 with the output of further operational amplifier A3 having a noise or transient suppression capacitor C3 across its input terminals, and having its inverting input interconnected through a resistor R44 with the output of amplifier A1. Amplifier A3 is openloop connected to provide means for detecting balancing of bridge 53, noting that the output voltage of amplifier A1 will be zero valued when such balancing occurs as the result of thermistor T attaining a preselected impedance level, following introduction of probe 23 into the region whose temperature is to be measured. Since FET Q8 is in series with meter 27, current thereto is inhibited until bridge balancing is obtained.

The output of amplifier A3 is connected to a circuit including a diode D12 and a resistor R45 controlling the charging of timing capacitor C4 at a rate determined by a resistor R48 and a potentiometer R49. Capacitor C4, resistors R48 and R49, and operational amplifier A4, whose inverting input is connected to C4 through a resistor R47, provides a timer circuit for initiating a predetermined timing interval upon the impedance of thermistor T attaining the preselected level causing bridge balancing. The timing interval may be of 10 seconds duration, for example. A clamp diode D14 connected across capacitor C4 insures that capacitor C3 begins charging from the same voltage at the initiation of each timing interval. The noninverting input of amplifier A4 is biased to the circuit ground through a resistor R51.

Between the output of amplifier A4 and the circuit ground is a circuit including a diode D15, a current limiting resistor R52, and an LED constituting signal light 29. The LED serves as means responsive to operation of the timer circuit for providing indication of the completion of the 10-second timing interval. A circuit connection is made from the output of amplifier A4 through a resistor R53 to the gate of FET Q7 for controlling conduction of the latter.

Operational amplifiers A5 and A6 are each open-loop connected to provide a switching circuit 55 serving as means for effectively deactuating, i.e., rendering inoperative, the temperature measuring circuitry including bridge 53 upon the potential of either battery 51a or 51b falling below a preselected level below which there would be an erroneous indication of temperature. Circuit 55 performs the same function as the Schmitt trigger circuit 39 of FIG. 3. The respective inverting and noninverting input of amplifiers A5 and A6 and interconnected with the regulated and unregulated battery potential supply leads L11–L14 by voltage divider circuits as indicated including resistors R55–R62, for causing the output voltage of these two differential amplifiers to vary as a function of the battery and regulated potentials. Specifically, each of amplifiers A5 and A6 is adapted to provide a positive output voltage if the voltage of a respective one of the batteries 51a and 51b falls below a preselected level.

The two outputs of amplifiers A5 and A6 are connected together through diodes D17 and D18 and then through a resistor R63 to the junction of resistors R34 and R37, i.e., to one side of bridge 53. Should the unregulated positive or negative potentials on leads L11 or L12, respectively, become less than the preselected value, the output of a respective one of amplifiers A5 or A6 will become positive to cause a relatively high potential to be applied to the junction of resistors R34 and R35, effectively overdriving the bridge and imbalancing it thereby to prevent the output of amplifier A1 from becoming positive and thereby preventing normal indication by meter 27. Thus, the measuring circuitry of this embodiment is effectively deactivated should the battery potential fall below a preselected level, as through battery voltage decay, below which there would otherwise be an erroneous temperature indication. Display of the indicated temperature is thus prevented if there would be a substantial error resulting from reduction of battery potential.

Figure 2:
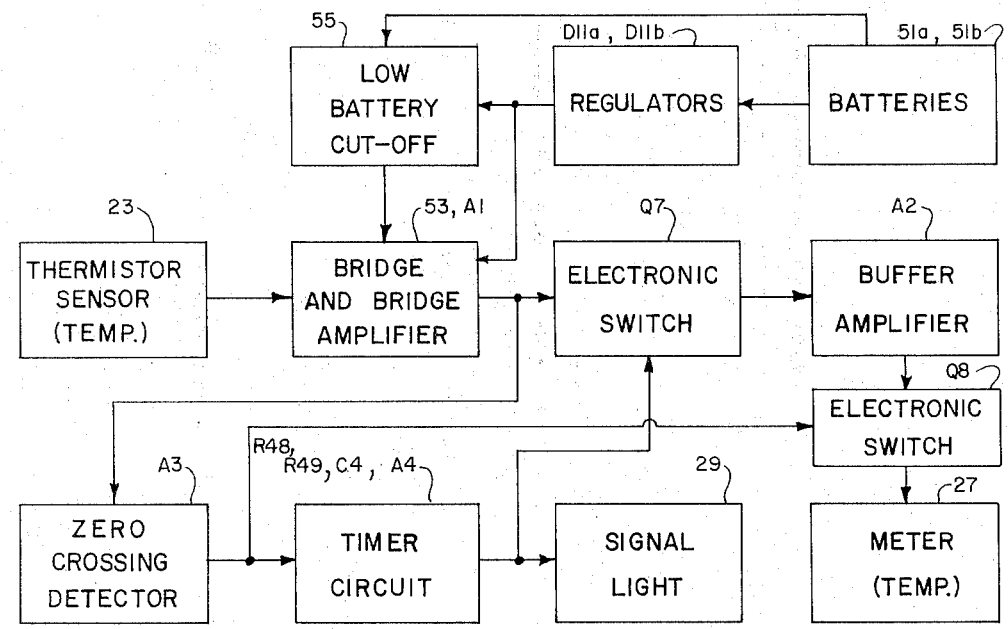
FIG. 2 is a block diagram of circuitry of one embodiment of the invention.

FIG. 2 constitutes a block diagram of the circuitry of FIG. 6 to aid in understanding of such circuitry. Diodes D11a and D11b are shown as a regulator circuit while switching circuit 55 provides a low battery cut-off function interconnected with bridge 53. FET Q7 constitutes an electronic switch controlling the response of buffer amplifier A2 to the output voltage of amplifier A1. Amplifier A3 is a zero-crossing detector responsive to amplifier A1 and controlling FET Q8, which constitutes an electronic switch determining the operation of meter 27. Capacitor C4 and amplifier A4 constitute a timer circuit for controlling the conduction of FET Q7 and the operation of signal light 29.

In operation of the FIG. 6 circuitry, and referring to FIGS. 2 and 6, probe 23 is introduced into the region whose temperature is to be measured. As the temperature of thermistor T increases, bridge 53 is responsive to the change in the impedance of thermistor T and the output voltage of amplifier A1 accordingly increases, being an amplification of the potential across bridge 53. When the output potential of amplifier A1 crosses through zero value from a relatively negative value on its way to becoming positive, thereby indicative of balancing of bridge 53 as a result of the impedance of thermistor T having obtained a preselected value, amplifier A3 detects such so-called zero crossing and supplies a corresponding output voltage. This output voltage of amplifier A3 reverse biases diode D12 to permit charging of timing capacitor C4 and thereby initiates a predetermined timing interval, e.g., of 10 seconds duration. At the end of the timing interval, the output of amplifier A4 becomes positive, energizing LED signal light 29, thereby to indicate the end of the interval. At the same time, the positive output potential from amplifier A4 causes FET Q7 to become nonconductive so that capacitor C2 remains charged to the output voltage of amplifier A1 at the end of the timing interval. The output voltage from amplifier A3 also causes FET Q8 to become conductive to permit energization of meter 27 by amplifier A2. Consequently, meter 27 is not rendered operative until the output of amplifier A1 becomes positive in value and is thus prevented from being supplied with a negative voltage which might otherwise cause sticking, et cetera.

Amplifier A2, in having unity voltage gain, acts as a power of buffer amplifier for driving meter 27 to indicate a temperature which is a function of the measured temperature of thermistor T at the end of the ten-second interval. Meter 27 is scaled so that the indicated temperature is an extrapolation of the measured temperature of thermistor T at the end of this timing interval and represents the actual temperature in the region. Since the output of amplifier A2 is proportional to the voltage on capacitor C2, the capacitor tends to cause meter 27 to retain the indicated temperature for a period of 10 seconds duration or more following the completion of the timing interval. The user of the instrument may then read the meter accurately and without haste. For this purpose, capacitor C2 is preferably relatively large in value, such as 100 microfarads. It is important to note that Sensistor S acts to compensate for variations in quill temperature in the same way as in the operation of the circuitry of FIG. 3 to provide a highly accurate temperature measurement indication by meter 27.

The circuitry is deenergized by returning probe 23 to its storage position in receptacle 30. However, if probe 23 is simply removed from the mouth or other region following such indication by meter 27 of the measured temperature and without being stored, resetting of the circuitry is automatic. The resultant cooling of thermistor T will cause the output voltage of amplifier A1 to decrease in value. When this output potential passes again through zero value, the output potential of amplifier A3 will once more render FET Q8 nonconductive to prevent further operation of meter 27. This also discharges capacitor C4 and terminates the positive output voltage from amplifier A4 so as to extinguish LED signal light 29. Also, FET Q7 is made conductive to effectively reconnect capacitor C2 to the output of amplifier A1.

Referring to FIGS. 8–10, a preferred construction of probe 23 is shown which may be used with an electronic thermometer unit 21 as shown in FIG. 1 and incorporating the circuitry of FIG. 6. Probe 23 is preferably constructed mainly of parts of suitable synthetic resin materials, which may be injection molded. As previously and briefly noted, probe 23 includes a quill 31, here shown broken for purposes of illustration, a handle portion 33 and a tip 35 at the distal end of quill 31. The term 'quill' is used in the sense of its dictionary meaning of a small tube or hollow shaft. Handle 33 includes a recess 57 of circular cross section into which is fitted a sleeve portion 59 of quill 31, which is generally annular in cross section to provide space therethrough for leads 61 connecting thermistor T.

Quill 31 includes a collar 63 of increased diameter having a shoulder 65 which is butted against a corresponding shoulder 67 of handle 33. Handle 33 includes a sleeve extension 69 beyond which sleeve 59 of quill 31 extends. Projections 71 of sleeve 59 extend over the lip 72 of sleeve extension 69 to secure quill 31 to handle 33. An O-ring 73 provides a relatively hermetic seal between quill 31 and handle 33.

Collar 63 provides a smooth taper from handle 33 to the reduced shank diameter of quill 31 at 75. The shank is tapered gradually to a still more reduced diameter at 77. The diameter of quill 31 is then even further reduced to provide a distal portion 79 of the quill on which is secured a metallic sleeve constituting tip 35. A ferrule 81 is fitted in a recess 83 at the end of portion 79 and includes itself a recess 85 in which is positioned thermistor T, here shown as comprising an epoxy bead type thermistor. A void at the end of sleeve 35 is preferably filled with a thermally conductive paste as indicated at 87 of a commercially available type. The metallic tip 35 and thermal paste 87 provide a relatively good heat exchange relationship between thermistor T and the region into which the tip is introduced for temperature measurement.

Handle 33 is of generally elliptical cross section as shown in FIG. 10 and includes a chamber 89 therein. Two grooves 91 extend longitudinally along the interior opposite walls of chamber 89. A relatively thin, flat support board 93 is positioned in grooves 91 so as to extend across chamber 89. Board 93, which may be of a suitable electrically insulating material such as used in printed circuit board construction, in provided with a rectangular aperture 95. Conventional turret solder terminals 97 are positioned at opposite ends of aperture 95 and around these are secured the leads of Sensistor S thereby to position the latter in spaced relation to the walls of chamber 89 and also to any other elements of the assembly. Accordingly, the temperature of Sensistor S is maintained substantially at the temperature of the air entrapped within chamber 89. Since the interior of quill 31 communicates with chamber 89, Sensistor S will be responsive over a relatively long term to changes in the temperature of quill 31 and handle 33 resulting from various factors thermally influencing probe 23, such as changes in ambient temperature. However, a relatively poor heat exchange relationship is thus provided between Sensistor S and the region into which tip 35 is introduced for temperature measurement.

Support board 93 includes additional turret terminals 99 for connecting Sensistor S and the leads 61 from thermistor T with cable 25. Cable 25 enters probe 23 through an aperture 101 in the side of a rounded cap 103 fitted into the end of handle 33 and locked thereto by tabs or projections 104 at the ends of a pair of fingers 105 which extend into cavity 93 such that the projections 104 fit into apertures or recesses 107 of handle 33. An O-ring 109 provides a relatively hermetic seal between cap 103 and handle 33.

Figure 7:
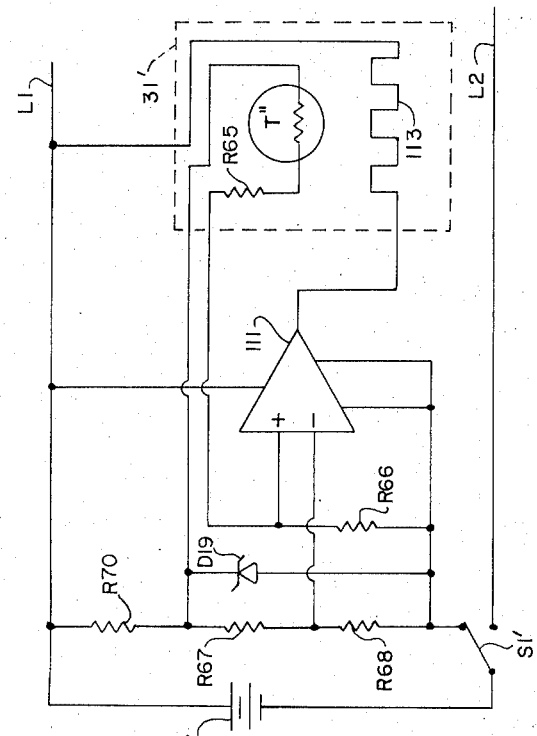
FIG. 7 is a schematic circuit diagram of portions of the circuitry of a further embodiment which also includes the circuitry of FIG. 3.

The circuit of FIG. 7 may be interconnected with the circuitry shown in FIG. 3 to provide another embodiment of the invention. When these circuits are so combined, leads L1 and L2 of FIG. 3 are connected to leads L1 and L2 of FIG. 7 and battery 37 is then connected as indicated in FIG. 7, rather than as in FIG. 3. Switch S1 of FIG. 3 is replaced by an S.P.D.T. switch S1' in FIG. 7. Circuitry including a differential operational amplifier 111, preferably of the monolithic integrated circuit variety as explained previously, has its output connected to one side of a resistance heater element 113 associated with the quill 31' of a probe especially adapted for this embodiment, the other side of heater element 113 being connected to lead L1. The noninverting input terminal of amplifier 111 is interconnected with a voltage divider connected between leads L1 and L2 (when switch S1' is in the position shown) which includes a quill temperature sensing thermistor T'' of the probe, a trimmer resistor R65, and a resistor R66. The inverting input of amplifier 111 is connected to a voltage divider across leads L1 and L2 (when switch S1' is in the position shown) having resistors R67, R68 and R70. A Zener diode D19 is connected across resistors R67 and R68.

The circuitry of FIG. 7 constitutes means for maintaining quill 31' at a preset temperature level. For that purpose, thermistor T'' associated with quill 31' is adapted for being responsive to variations in the temperature of the quill thereby to sense the temperature thereof. Amplifier 111 is adapted to vary the energization of heater element 113 as a function of the impedance of thermistor T'' in order to maintain the quill relatively precisely at a preset temperature level. Thermistor T'' is of the NTC type. The preset temperature level is chosen to be somewhat less than the preselected temperature level of the region temperature sensing thermistor T at which level the timing circuitry of FIG. 3 is adapted to initiate a predetermined timing interval. For example, the probe tip and thermistor T may be heated to about 92°-94°F., while bridge balancing (and thus initiation of the timing interval) may occur at from 94°-95°F. or so, for example.

FIG. 11 is a pictorial representation of portions of a probe 23' especially adapted for being heated and maintained at a preset temperature by the circuitry of FIG. 7. Probe 23' is shown as having a quill 31' of generally annular cross section. A tip portion 35' of the probe, also of annular cross section, is represented as being slidably fitted into the bore 115 of quill 31' and includes the region temperature sensing thermistor T at one end thereof. The depth to which tip 35' is fitted into quill 31' is determinative of the heat transfer characteristics between quill 31' and tip 35' and is adjusted accordingly to produce the desired heating effect of the quill upon tip 35' and thermistor T. Tip 35' is adapted for being introduced into the region for measuring the temperature therein. Both quill 31' and tip 35' are preferably metallic, e.g., of aluminum or stainless steel. Heater element 113 is constituted by a length of resistance heater wire wrapped of several spirally wound turns and positioned interiorly of quill 31'. Thermistor T'' is positioned within the bore of quill 31' centrally of the several turns of heater element 113 so as to be responsive to variations in the temperature of quill 31'. Thermistor T'', like thermistor T, may be of the bead type. A pair of leads 117 permits connection of thermistor T'' with the noninverting input of differential amplifier 111, while a pair of leads 119 permits interconnection of heater element 113 with the output of this differential amplifier. A pair of leads 121 is provided for connection of thermistor T with bridge 39 of FIG. 3.

In operation, when probe 23' is removed from its stored position, the blade switch S1' is moved from the position shown in FIG. 7 to the position connecting battery 37 across leads L1 and L2 for energization of the portions of the circuitry depicted in FIG. 3. Of course, switch S1' may instead be pushbutton operated, et cetera. Since quill 31' is maintained relatively precisely at this preset temperature level, i.e., between 92°-94°F., it is relatively immune from the effect of various external thermal factors such as changes in ambient temperature or the effects of handling of the probe as through use thereof which might otherwise affect the accuracy of the temperature indicated by meter 27. The indicated temperature is thus a highly accurate representation of the actual temperature in the region into which the tip of probe 23' is introduced.

Figure 12:
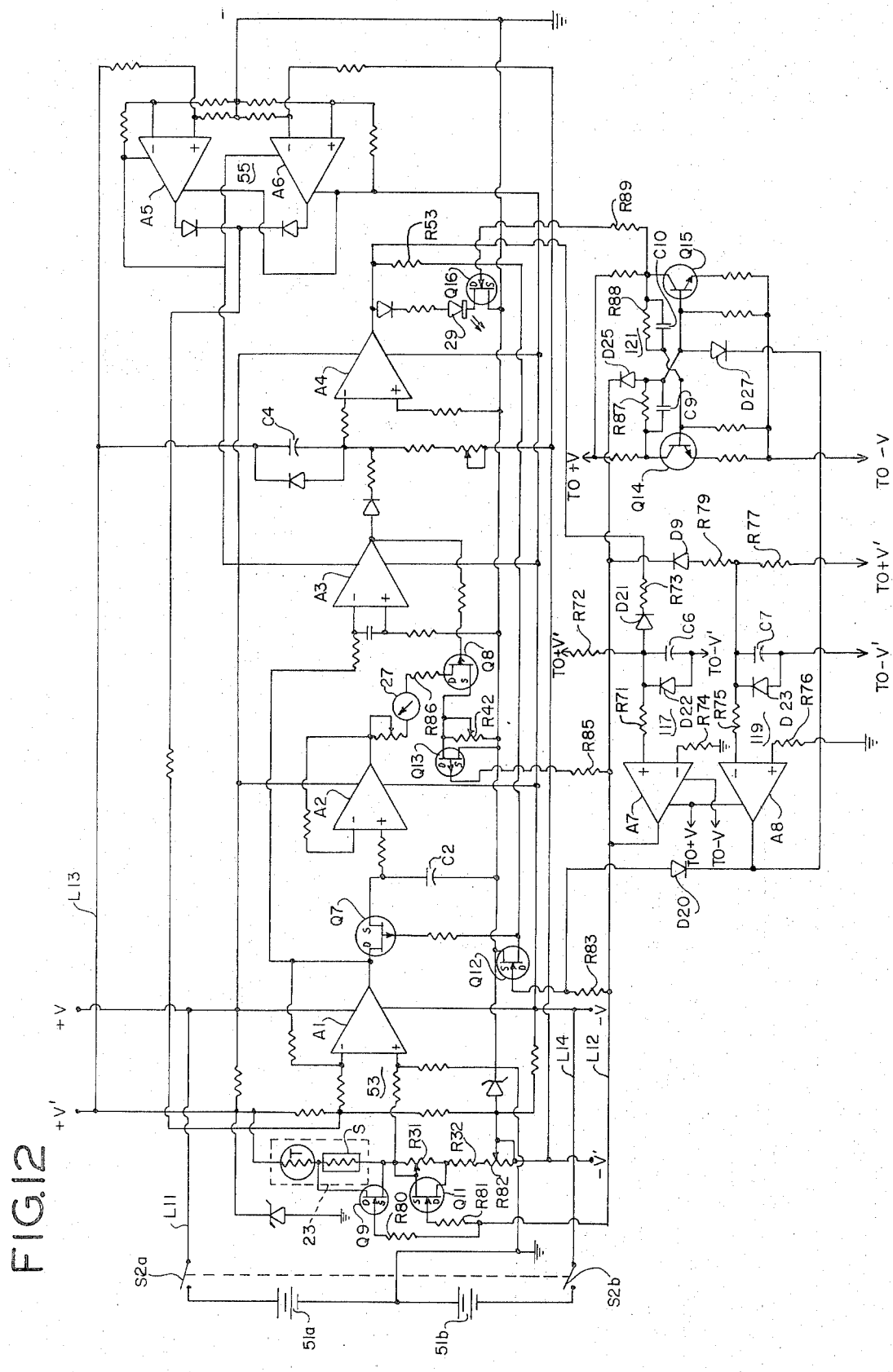
FIG. 12 is a schematic circuit diagram of an improved version of the FIG. 6 embodiment.

Referring to FIG. 12, an improved version of the circuitry of FIG. 6 is represented and operates not only to provide a short-term temperature indication but, after a delay, effectively remeasures the temperature to provide a verified indication. Portions of the circuitry of FIG. 6 which are included in the FIG. 12 embodiment are unchanged except as noted herein and hence specific description thereof is omitted. To leads L11-L14, which supply the regulated and unregulated potential to the circuitry, have been added terminals which are designated +V', +V, -V, and -V', designating respectively the positive regulated supply, positive unregulated supply, negative unregulated supply, and negative regulated supply voltages. The circuitry of FIG. 12 additional to that shown in FIG. 6 is then connected for being supplied with these voltages as indicated to these four terminals.

At 117 is indicated a timer circuit including an operational amplifier A7 of the type previously described and another timer circuit 119 having an operational amplifier A8. Amplifiers A7 and A8 may each be one of a dual type operational amplifier circuit pair of a commercially available type as noted previously. One side of a timing capacitor C6 is connected through a resistor R71 to the noninverting input of amplifier A7 and is adapted to be charged from the positive regulated supply voltage +V' at a rate determined by a resistor R72. A series circuit including a diode D21 and a resistor R73 is connected from the junction of capacitor C6 with resistor R72, and the output of amplifier A4, for causing timer circuits 117 and 119 to be responsive to operation of the timer circuit which includes amplifier A4. Similarly, a timing capacitor C7 is interconnected through a resistor R75 to the inverting input of amplifier A8. Capacitor C7 is adapted for being charged through a resistor R77 when permitted to do so by the voltage at the output of amplifier A7, and with which capacitor C7 is interconnected through a resistor R79 and a diode D9. Clamp diodes D22 and D23 are connected across capacitors C6 and C7, respectively. The inverting inputs of amplifier A7 and A8 are grounded through respective resistors R74 and R76.

The output voltage of amplifier A7 is adapted also to control conduction of FET Q9 having its drain-source electrodes connected across Sensistor S by virtue of a connection including a resistor R80 between the output of amplifier A7 and the FET's gate. Another FET Q11 has its gate connected through a resistor R81 to the output of amplifier A7 and is controlled thereby. The drain-source electrodes of FET Q11 are connected between the wiper of potentiometer R31 and the lower side thereof. The arm or bridge 53 which includes potentiometer R31 is modified to include an additional calibration potentiometer R82.

Another FET Q12 has its gate connected through a diode D20 to the output of amplifier A8 and through a resistor R83 to the output of amplifier A7. This FET has its drain-source electrodes connected between the circuit ground and the gate of FET Q7 for control of the latter. Still another FET Q13 has its gate connected through a resistor R85 to the output of amplifier A7, and has its drain-source electrodes connected across meter calibration potentiometer R42. A further resistor R86 is added in series with meter 27 and FET Q8.

The output voltage of amplifier A7 also enables operation of an astable multivibrator circuit 121 comprising a pair of NPN transistors Q14 and Q15 cross-coupled in conventional fashion by resistors R87 and R88 and capacitors C9 and C10. The base of transistor Q15 is connected to the output of amplifier A7 through a diode D25 and to the output of amplifier A8 through a diode D27. The drain-source electrodes of a still further FET Q16 are connected in series with LED signal light 29. The gate of FET Q16 is interconnected with the collector of transistor Q15 through a resistor R89, so that conduction of FET Q16 is controlled by multivibrator 119, thereby to control energization of the LED signal light 29.

Except as noted hereinafter, operation of the circuitry of FIG. 12 is substantially identical with that of FIG. 6. Upon an output voltage from amplifier A4 for causing energization of LED signal light 29, diode D21 of timer circuit 117 becomes reverse biased to cause charging of capacitor C6. The size of resistor R72 is chosen to provide a charge rate for capacitor C6 for causing the output of amplifier A7 to become positive after a timing interval of preferably about ten seconds. This ten-second period provides a delay interval following the first indication by meter 27 prior to initiating the verification mode of operation. When the output of amplifier A7 thus becomes positive, FET's Q9 and Q11 are caused to become conductive, respectively shunting Sensistor S and that portion of the resistance of potentiometer R31 between its wiper and lower end. The conductive state of FET Q11 effectively recalibrates bridge 53 for compensating for the shunting of Sensistor S. Sensistor S is shunted to eliminate its effect on the temperature measurement during the verification mode. FET Q12 also becomes conductive in turn causing FET Q7 to become conductive for reconnection of capacitor C2 to the output of amplifier A1. Accordingly, the voltage presented to the noninverting input of amplifier A2 is a function of the remeasured temperature of thermistor T. FET Q13 also becomes nonconductive as a result of the positive voltage at the output of amplifier A7, effectively terminating its shunting of potentiometer R42, in effect, recalibrating meter 27. Thus FET Q13 effectively constitutes means for recalibrating meter 27 at the completion of the timing interval determined by amplifier A7, capacitor C6, and resistor R72.

The positive voltage at the output of amplifier A7 provides two additional effects: First, diode D9 becomes reverse biased, permitting capacitor C7 to charge through resistor R77 to begin a further timing interval. Second, diode D25 becomes reverse biased to enable operation of multivibrator circuit 121. Multivibrator 121 thus begins to oscillate at a suitable switching rate determined by resistors R87 and R88 and capacitors C9 and C10. This switching causes the voltage at the collector of transistor Q15 to alternate between relatively positive and relatively negative levels for causing FET Q16 periodically to become conductive. Since, at this time, amplifier A4 is providing an output voltage for causing energization of signal light 29, the periodic conduction of FET Q16 causes intermittent energization of signal light 29 to provide flashing indication during the timing interval controlled by timer circuit 119. The values of capacitor C7 and resistor R77 are preferably chosen for causing this timing interval to be about 30 seconds in duration. At the end of this 30-second interval, amplifier A8 provides a negative voltage at the output thereof which forward biases diode D27 to terminate oscillation of multivibrator 121. The resulting potential at the collector of transistor Q15 causes FET Q16 to remain conductive. Accordingly, signal light 29 ceases its flashing indication and instead provides a second steady indication signalling completion of the timing interval determined by timer circuit 119.

The negative output voltage of amplifier A8 also forward biases diode D20, causing FET Q12 once more to become nonconductive and in turn causing FET Q7 to become nonconductive. Accordingly, capacitor C2 remains at the voltage which was present at the output of amplifier A1 when transistor Q7 becomes nonconductive. FET Q12 thus effectively constitutes means for causing remeasuring of the impedance of thermistor T at the completion of the timing interval determined by amplifier A8, capacitor C7 and resistor R77. Amplifier A2 drives meter 27 to provide indication thereby of a temperature which is a function of the remeasured impedance of thermistor T which constitutes a verified indication of the temperature of the region into which probe 23 is introduced. Meter 27 may thus be read upon the second steady indication by signal light 29 to determine the verified temperature measurement. Preferably this verified indication is itself an extrapolation of the actual temperature which is being measured in the region in question. Otherwise, it would be required to permit thermistor T to attain the actual temperature in the region, requiring additional time.

From the foregoing, it may be seen that in the operation of the instrument, probe 23 is simply permitted to remain in the region into which it has been introduced for temperature measurement following the first indication of temperature, as signalled by the first steady indication by signal light 29, of meter 27. Timer circuit 117 begins timing out its timing interval of 10 seconds. This provides an adequate delay period during which the retained indication of meter 27 may be accurately read. At the end of this first 10-second interval, the verification mode of operation is initiated and signal light 29 begins its flashing indication, thereby signalling that a verification measurement is taking place. When the flashing indication is terminated and signal light 29 thus once more provides a steady indication, meter 27 may then again be read to determine the verified temperature measurement. This verified indication is retained for several seconds by virtue of the voltage to which capacitor C2 remains charged. If there is a discrepancy between the initial and verified temperature indications, probe 23 may be removed, e.g., from the patient's mouth, and the circuitry then resets automatically as described with regard to FIG. 6 upon the temperature of thermistor T having cooled sufficiently. A new temperature measurement may then be initiated.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A probe-type thermometer for accelerated indication of temperatures comprising:
   a probe for introduction into a region having a temperature which is to be measured, said probe including a temperature sensitive element having a heat sensing relationship with said region when the probe is introduced thereinto;
   means for initiating a predetermined timing interval in response to the temperature of the element exceeding a preselected level following introduction of the probe into the region;
   means for measuring the temperature of the element at the completion of the timing interval and before the temperature thereof reaches the actual temperature in the region, said measurement means including an impedance bridge having an output which varies as a continuous function of the temperature of the element; and
   means for indicating a temperature which is a function of the output of the bridge and thus of the measured temperature of the element at the completion of the timing interval, the indicated temperature being a substantially accurate extrapolation of the temperature in the region and being thereby indicated in substantially less time than required for the temperature of the element to reach the actual temperature in the region.

2. A probe-type thermometer as set forth in claim 1 wherein said means for indicating a temperature comprises a meter, said thermometer further comprising means for causing the meter to retain the indicated temperature at the completion of the timing interval whereby the indicated temperature may be accurately observed.

3. A probe-type thermometer as set forth in claim 1 further comprising means for signalling completion of the timing interval.

4. A probe-type thermometer for accelerated indication of temperatures comprising:
   a probe for introduction into a region having a temperature which is to be measured, said probe including a temperature sensitive element having a heat sensing relationship with said region when the probe is introduced thereinto, said element having an impedance which varies as a function of the temperature of the element;
   means for initiating a predetermined timing interval in response to the temperature of the element exceeding a preselected level following introduction of the probe into the region, said timer means being responsive to a preselected impedance value of the element which corresponds to said preselected temperature level, said timing means being adapted to interrupt and extend the timing period if the temperature of the element transitorily falls below said preselected temperature level;
   means for measuring the temperature of the element at the completion of the timing interval and before the temperature thereof reaches the actual temperature in the region, said means for measuring the temperature of the element being responsive to said impedance; and
   means for indicating a temperature which is a function of the measured temperature of the element at the completion of the timing interval, the indicated temperature being a substantially accurate extrapolation of the temperature in the region and being thereby indicated in substantially less time than required for the temperature of the element to reach the actual temperature in the region.

5. A probe-type thermometer as set forth in claim 4 further comprising means for initiating an extended mode of temperature measurement following indication of temperature at the completion of said predetermined timing interval, said measurement means being adapted to remeasure the impedance of the element, said means for indicating a temperature providing a further indication of the temperature in the region.

6. A probe-type thermometer for accelerated indication of temperatures comprising:
   a probe for introduction into a region having a temperature which is to be measured, said probe including a temperature sensitive element having a heat sensing relationship with said region when the probe is introduced thereinto;
   means for initiating a predetermined timing interval in response to the temperature of the element exceeding a preselected level following introduction of the probe into the region;
   means for measuring the temperature of the element at the completion of the timing interval and before the temperature thereof reaches the actual temperature in the region;
   means for indicating a temperature which is a function of the measured temperature of the element at the completion of the timing interval, the indicated temperature being a substantially accurate extrapolation of the temperature in the region and being thereby indicated in substantially less time than required for the temperature of the element to reach the actual temperature in the region; and heater means for maintaining the probe substantially at a preset temperature level.

7. A probe-type electonic thermometer for accelerated indication of temperatures comprising:
a probe for introduction into a region having a temperature which is to be measured, said probe including a temperature sensitive element having an impedance which varies as a function of the temperature thereof, said element having a heat exchange relationship with the region when the probe is introduced thereinto;
means for initiating a predetermined timing interval in response to the impedance of the element attaining a preselected level following introduction of the probe into the region;
means including an impedance bridge for measuring the impedance of the element at the completion of the timing interval and before the temperature thereof reaches the actual temperature in the region, said bridge having an output which varies as a continuous function of the temperature of the element, said timing interval initiation means including means for detecting balancing of said bridge, the bridge being adapted to be balanced when the impedance of the element reaches said preselected level; and
means for indicating a temperature which is a function of the output of the bridge and thus the measured impedance of the element at the completion of the timing interval, the indicated temperature being a substantially accurate extrapolation of the temperature in the region and being thereby indicated in substantially less time than required for the temperature of the element to reach the actual temperature in the region.

8. A probe-type electronic thermometer as set forth in claim 17 which further includes a battery for supplying power to said timing interval initiating means, said thermometer including an enclosure encasing the battery and all the aforesaid means and being interconnected by a flexible cable to said probe, said enclosure further including means for securing said probe relative to said enclosure when not in use, and a switch adapted to be moved to a deactuated position when the probe is secured to said enclosure, said switch when deactuated disconnecting said battery from said timing interval initiating means.

9. A probe-type electronic thermometer as set forth in claim 7 wherein said means for initiating a predetermined timing interval comprises:
a differential amplifier having a pair of inputs connected in a circuit across said bridge and an output providing a signal indicative of balancing of the bridge;
a timer circuit interconnected with the differential amplifier and adapted to initiate a timing interval each time an output signal is produced by the amplifier; and
indicator means responsive to operation of the timer circuit and operative to provide indication at the completion of the timing interval.

10. A probe-type electronic thermometer as set forth in claim 9 wherein said timer circuit includes a timing capacitor connected for being charged upon an output signal from said differential amplifier, a unijunction transistor adapted to be triggered for supplying a pulse when said capacitor is charged to a predetermined voltage, and a triggerable semiconductor current switching device adapted for being triggered by the pulse, said indicator means comprising a signal means connected for being energized upon triggering of the switching device.

11. A probe-type electronic thermometer as set forth in claim 9 wherein said timer circuit includes a timing capacitor connected for being charged when an output signal is produced by said differential amplifier, and an operational amplifier connected for providing an output voltage when the capacitor is charged to a predetermined voltage, said indicator means comprising a signal means adapted to be energized by said output voltage.

12. A probe-type electronic thermometer as set forth in claim 7 further comprising:
first amplifier means having an input interconnected in a circuit with said bridge and having an output for delivering an output voltage which varies as a function of the impedance of said element;
a capacitor connected for being charged to said output voltage;
second amplifier means having an input interconnected with the capacitor and having an output interconnected with said meter for causing the meter to indicate a temperature which is proportional to the voltage to which the capacitor is charged, the capacitor tending to cause the temperature indicating means to retain the indicated temperature for a period following the completion of the timing interval.

13. A probe-type thermometer comprising:
a temperature probe including an elongate quill a portion of which is adapted to be introduced into a region for measuring a temperature therein, said quill portion including a first temperature sensitive element adapted to have a relative good heat exchange relationship with the region when the quill is introduced thereinto, the quill having a second temperature sensitive element spaced from the first element and responsive to the temperature of the quill but having a relatively poor heat exchange relationship with the region when the quill is introduced thereinto;
temperature measuring means interconnected with said elements and responsive jointly thereto for providing a temperature measurement which is a function of the temperatures thereof when the probe is introduced into the region; and
means responsive to operation of said measuring means for indicating the measured temperature in the region whereby accuracy of the indicated temperature is substantially unaffected by variations of the quill temperature.

14. A probe-type thermometer as set forth in claim 13 wherein said first element has an impedance which varies as a function, having a first algebraic sense, of the temperature thereof, and said second element has an impedance which varies as a function, having an opposite algebraic sense, of the temperature thereof; and wherein said temperature measuring means is responsive jointly to the impedances of said elements.

15. A probe-type thermometer as set forth in claim 14 wherein said first element is a thermistor having a negative temperature coefficient of resistivity and said second element is a silicon resistor having a positive temperature coefficient of resistivity.

16. A probe-type thermometer as set forth in claim 14 wherein said temperature measuring means comprises an impedance bridge and said elements are connected in at least one arm of the bridge.

17. A probe-type thermometer as set forth in claim 16 wherein said elements are connected in a series circuit in one arm of the bridge.

18. A probe-type thermometer as set forth in claim 13 wherein said quill includes a handle portion from which the quill extends, said second element being located in the handle portion.

19. A probe-type thermometer as set forth in claim 17 wherein said quill portion adapted to be introduced into the region includes a tip portion including said first element and said handle portion includes a chamber and means for supporting said second element in the chamber.

20. A probe-type thermometer as set forth in claim 19 wherein said second element includes a pair of leads, said supporting means including a pair of terminals to which said leads are secured for positioning of said second element in spaced relation to the walls of the chamber and to the terminals whereby said second element is maintained substantially at the temperature within the chamber.

21. The method of measuring temperature in a region by means of a temperature sensitive impedance element which is part of a temperature probe and is influenced by variations in the temperature of the probe caused by factors outside the region in a manner tending to cause error in the indicated temperature, said method comprising:
introducing the element into the region;
initiating a predetermined timing interval in response to the temperature of the element exceeding a preselected level following the introduction of the element into the region;
measuring the impedance of the element at the end of said timing interval, but before the temperature thereof reaches the actual temperature in the region;
indicating a temperature which is a function of the measured temperature of the sensing element at the end of said timing interval, the indicated temperature being an extrapolation of the measured temperature of the sensing element at the end of said timing interval and representing the actual temperature in the region and whereby the indicated temperature is indicated in substantially less time than required for the temperature of the element to reach the actual temperature in the region;
associating a further temperature sensitive element with the probe;
measuring the temperature of the probe by measuring the impedance of the further element; and
causing the indicated temperature to be also a function of the measured temperature of the probe whereby the indicated temperature is a highly accurate representation of the actual temperature in the region.

22. The method of measuring temperature as set forth in claim 21 further comprising retaining the indicated temperature for a period following indication thereof.

23. The method of measuring temperature as set forth in claim 21 further comprising:
initiating a second predetermined timing interval at the end of the first said timing interval;
remeasuring the impedance of the element at the end of the second timing interval; and
indicating a temperature which is a function of the remeasured temperature of the element at the end of the second timing interval to provide a verified representation of the actual temperature in the region.

24. A probe-type thermometer for accelerated indication of temperature comprising:
a probe for introduction into a region having a temperature which is to be measured, said probe including an elongate quill having a portion including a first temperature sensitive impedance element having a heat sensing relationship with said region when the probe is introduced thereinto;
a heater element associated with the quill;
means for energizing the heater element to maintain the probe substantially at a preset temperature level;
a second temperature sensitive impedance element spaced from the first said impedance element and adapted to be responsive to variations in the temperature of said quill, said energizing means being responsive to variations in the impedance of said second impedance element for maintaining said quill relatively precisely at said present temperature level;
means for initiating a predetermined timing interval following introduction of the probe into the region;
means for measuring the temperature of the element at the completion of the timing interval; and means for indicating a temperature which is a function of the measured temperature of the element at the completion of the timing interval, the indicated temperature being a substantially accurate extrapolation of the temperature in the region and being thereby indicated in substantially less time than required for the element to reach the actual temperature in the region.

25. A probe-type thermometer as set forth in claim 24 wherein said energizing means comprises a differential amplifier having an input interconnected with said second impedance element and an output connected for controlling the energization of said heater element as a function of the impedance of the second impedance element.

26. A probe-type thermometer as set forth in claim 25 wherein said impedance elements comprise thermistors.

27. A probe-type thermometer as set forth in claim 24 wherein said measuring means comprises an impedance bridge including the first said temperature sensitive element.

28. A probe-type thermometer as set forth in claim 24 wherein said means for initiating a timing interval is operative to initiate the timing interval upon the temperature of the first impedance element exceeding a preselected level higher than said preset level.

29. A probe-type electronic thermometer comprising:
a probe for introduction into a region having a temperature which is to be measured, said probe including a temperature sensitive element having an impedance which varies as a function of the temperature thereof, said element having a heat sensing relationship with the region when the probe is introduced thereinto;

means for initiating a first predetermined timing interval in response to the impedance of the element attaining a preselected level following introduction of the probe into the region;

means including an impedance bridge for measuring the impedance of the element at the completion of the first timing interval, said means for initiating a first timing interval comprising a first timer circuit responsive to the voltage across said bridge;

a meter for indicating a temperature which is a function of the measured impedance of the element at the completion of the first timing interval, the indicated temperature being a substantially accurate extrapolation of the temperature in the region;

means including a second timer circuit responsive to operation of the first timer circuit for initiating a second predetermined timing interval following indication of temperature at the completion of the first timing interval; and means for causing remeasuring of the impedance of the element at the completion of the second timing interval and indication by the meter of a temperature which is a function of the remeasured impedance thereby to provide a verified indication of the temperature in the region.

30. A probe-type electronic thermometer as set forth in claim 29 further comprising means for recalibrating the meter during the second timing interval for said verified indication thereby of the temperature in the region.

31. A probe-type electronic thermometer as set forth in claim 30 wherein said verified indication is a further extrapolation of the temperature in the region.

32. A probe-type electronic thermometer as set forth in claim 29 further comprising signal means responsive to operation of the first timer circuit for signalling completion of the first timing interval and responsive also to operation of the second timer circuit for signalling completion of the second timing interval.

33. A probe-type electronic thermometer as set forth in claim 32 further comprising means for intermittently energizing the signal means for intermittent indication thereof during the second timing interval.

34. A probe-type electronic thermometer as set forth in claim 29 further comprising a third timer circuit responsive also to operation of said first timer circuit and operative to provide a delay interval following the first timing interval and initiation of said second timing interval.

* * * * *

UNITED STATES PATENT OFFICE
CERTIFICATE OF CORRECTION

Patent No. 3,822,598                   Dated 7.9.74

Inventor(s) Benton H. Brothers et al.

It is certified that error appears in the above-identified patent and that said Letters Patent are hereby corrected as shown below:

Column 5, line 21, after "41" should be inserted --has an output which varies as a continuous function of the temperature of thermistor element T and --; line 43, after the period should be inserted -- Thus timer 45 and amplifier 43 are responsive to a preselected impedance value of element T which corresponds to the preselected temperature level. --. Column 6, line 15, after the period should be inserted -- If the temperature of the element transitorily should fall below the preselected level (e.g., if the quill should fall from or be coughed out of the mouth), the timing means will automatically interrupt and extend the timing interval. --; line 37, "10 to 25" should read -- twenty to twenty-five --. Column 12, line 53, "in provided" should read -- is provided --. Column 19, line 37, claim reference numeral "17" should read -- 7 --. Column 20, line 37, "relative" should read -- relatively --.

Signed and sealed this 5th day of November 1974.

(SEAL)
Attest:

McCOY M. GIBSON JR.
Attesting Officer

C. MARSHALL DANN
Commissioner of Patents